No. 756,564. PATENTED APR. 5, 1904.
J. W. BAMFORD.
BEARING.
APPLICATION FILED JUNE 27, 1903.
NO MODEL.
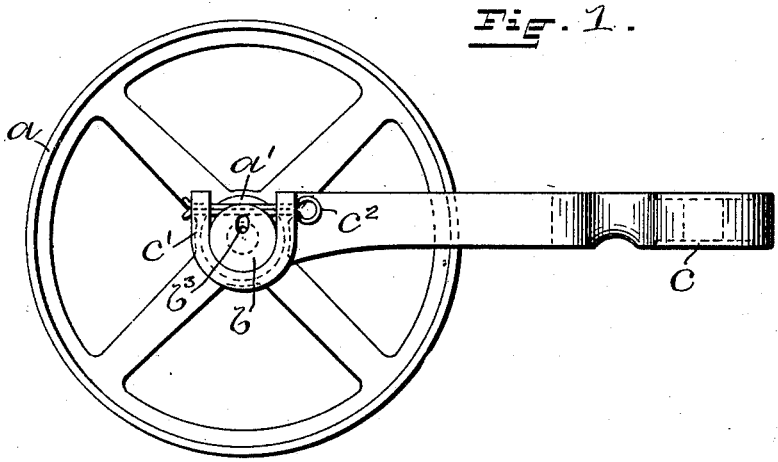
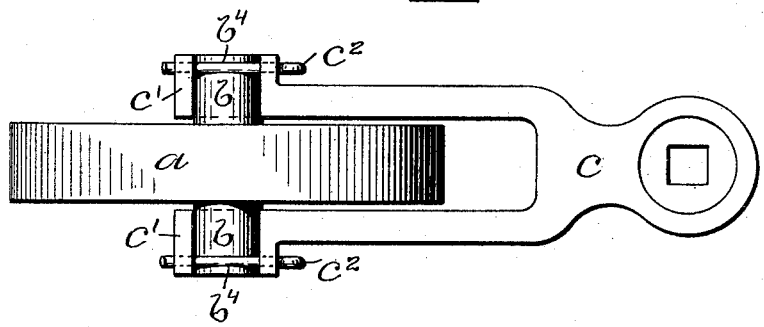
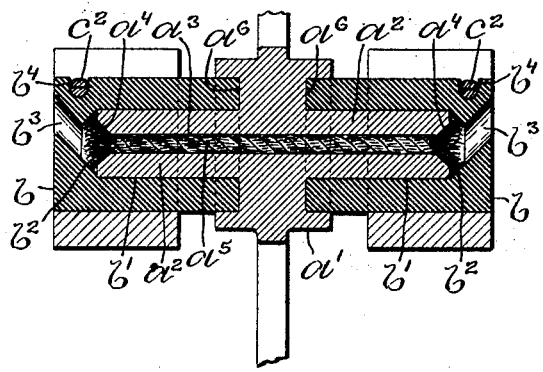
WITNESSES: INVENTOR:
Chas. H. Luther Jr. John W. Bamford
Ada E. Hagerty by Joseph A. Miller & Co.
ATTORNEYS.

No. 756,564. Patented April 5, 1904.

UNITED STATES PATENT OFFICE.

JOHN W. BAMFORD, OF PASCOAG, RHODE ISLAND, ASSIGNOR OF ONE-HALF TO JAMES H. SMITH, OF PASCOAG, RHODE ISLAND.

BEARING.

SPECIFICATION forming part of Letters Patent No. 756,564, dated April 5, 1904.

Application filed June 27, 1903. Serial No. 163,365. (No model.)

*To all whom it may concern:*

Be it known that I, JOHN W. BAMFORD, a citizen of the United States, residing at Pascoag, in the county of Providence and State of Rhode Island, have invented a new and useful Improvement in Bearings, of which the following is a specification.

This invention has reference to an improvement in bearings, and more particularly to an improvement in the bearings of tension-pulleys used in spinning-frames or similar machines. Tension-pulleys are used in spinning-frames or similar machines to give a uniform tension to the bands on the whirls of the spindles. They are usually pivotally secured in the machine with the face of the pulleys resting on the bands, the weight of the pulleys and their members exerting the required tension on the bands.

The object of my invention is to improve the construction of the tension-pulley bearings, whereby the bearings are protected from lint or other extraneous substances, are oiled for a longer period, and have less friction than has heretofore been attained.

My invention consists in the peculiar and novel construction of the bearings, the shaft in the bearings having an oil-wick extending lengthwise through the shaft and the pulley-hub having annular grooves for the inner ends of the bearings, as will be more fully set forth hereinafter.

Figure 1 is an end view of my improved bearings, showing the bearings and pulley supported on an arm and the means for securing the bearings in the open-top boxes of the arm. Fig. 2 is a plan view showing the bearings for the pulley-shaft in the boxes on the ends of the fork-shaped arm; and Fig. 3 is an enlarged detail sectional view taken lengthwise through the bearings, shaft, and hub of the pulley.

In the drawings, $a$ represents the pulley, $b$ $b$ the bearings, and $c$ the fork-shaped arm having the half-round open-top boxes $c'$ $c'$ on the ends of the fork for the bearings. The pulley $a$ has the hub $a'$ and the shaft $a^2$, with the central hole $a^3$ extending lengthwise through the shaft and ending in the outwardly-flaring openings $a^4$ $a^4$ for the ends of the oil-wick $a^5$, which extends through the shaft $a^2$ in the hole $a^3$. The cylindrical bearings $b$ $b$ are made of fibroid or other suitable material, and each bearing has the hole $b'$ for the shaft $a^2$, the oil-well $b^2$ at the end of the shaft, and the oil-hole $b^3$, extending downward at an angle from the outer end of the bearing into the oil-well $b^2$. The inner ends of the bearings extend into the annular grooves $a^6$ $a^6$ in the hub $a'$ and are prevented from turning in the boxes by the split pins $c^2$ $c^2$, passing through holes in the boxes and the transverse grooves $b^4$ $b^4$ in the bearings.

By extending the bearings into the hub of the pulley no lint or other extraneous substances can enter the bearings, and by the use of the oil-wick in the pulley-shaft the bearings have less friction and the shaft will revolve in the bearings for a longer period with one oiling than has heretofore been done.

It is evident that my improved bearings could be used for any purpose desired and that any well-known means could be used to secure the bearings in the arm $c$ or in the machine in which they would be used without materially affecting the spirit of my invention.

Having thus described my invention, I claim as new and desire to secure by Letters Patent—

1. The combination with bearings supporting a shaft, of a shaft having a hole extending lengthwise through it in which is a wick, the wick, a hub on the shaft provided with recesses to form seats for the inner ends of the bearings, and means for supplying oil to the wick, as described.

2. The combination with bearings having oil holes and chambers and supporting the ends of a shaft, of a shaft provided with a wick extending lengthwise through a hole in the shaft, the wick, and a central hub provided with recesses to form seats for the inner ends of the bearings, as described.

3. The combination with the pulley $a$ having the hub $a'$ provided with the grooves $a^6$ $a^6$, the shaft $a^2$ with the central hole $a^3$ ending in the outwardly-flaring openings $a^4$ $a^4$, and the wick $a^5$ in the hole $a^3$, of the bearings $b\ b$, each having the hole $b'$, the oil-well $b^2$, the oil-hole $b^3$ and the transverse groove $b^4$, and the fork-shaped arm $c$ having the half-round open-top boxes $c'\ c'$ with holes for the split pins $c^2\ c^2$, all for the purpose as described.

In testimony whereof I have signed my name to this specification in the presence of two subscribing witnesses.

JOHN W. BAMFORD.

Witnesses:
B. S. WEBSTER,
ADA E. HAGERTY.